(12) United States Patent
Wang et al.

(10) Patent No.: US 12,034,766 B2
(45) Date of Patent: Jul. 9, 2024

(54) METHOD AND SYSTEM FOR PROVIDING EDGE SERVICE, AND COMPUTING DEVICE

(71) Applicant: Huawei Cloud Computing Technologies, Co., Ltd., Guizhou (CN)

(72) Inventors: Nannan Wang, Shenzhen (CN); Boai Yang, Shenzhen (CN); Qing Yin, Xi'an (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 375 days.

(21) Appl. No.: 17/489,098

(22) Filed: Sep. 29, 2021

(65) Prior Publication Data
US 2022/0021701 A1 Jan. 20, 2022

Related U.S. Application Data

(63) Continuation of application No. PCT/CN2019/130296, filed on Dec. 31, 2019.

(30) Foreign Application Priority Data
Apr. 4, 2019 (CN) .......................... 201910271547.8

(51) Int. Cl.
*H04L 29/06* (2006.01)
*H04L 9/40* (2022.01)
(52) U.S. Cl.
CPC ...... *H04L 63/1458* (2013.01); *H04L 63/1425* (2013.01)
(58) Field of Classification Search
CPC ............. H04L 63/1458; H04L 63/1425; H04L 67/563; H04L 69/40; H04L 43/08;
(Continued)

(56) References Cited

U.S. PATENT DOCUMENTS 10,104,039 B1    10/2018  Knecht et al.
2001/0044275 A1* 11/2001  Yamaguchi ............. H04L 67/04
                                                        455/423
(Continued)

FOREIGN PATENT DOCUMENTS

CN          1949717 A      4/2007
CN        101175013 A      5/2008
(Continued)

OTHER PUBLICATIONS

NPL History Search (Year: 2024).*
(Continued)

*Primary Examiner* — Samson B Lemma
*Assistant Examiner* — Richard W Cruz-Franqui
(74) *Attorney, Agent, or Firm* — Conley Rose, P.C.

(57) ABSTRACT

A method for providing an edge service includes a first security agent that performs data stream transmission with a plurality of endpoint computing devices through an edge link, and each endpoint computing device obtains, using the first security agent, an edge service provided by an edge server. The first security agent determines, based on a data stream transmitted between each endpoint computing device and the first security agent, an abnormal endpoint computing device in the plurality of endpoint computing devices. The first security agent generates link abnormality information, and the link abnormality information includes an address of the abnormal endpoint computing device. The first security agent sends the link abnormality information to the security controller. The security controller receives the link abnormality information, and generates edge link information including an address of a second security agent based on the link abnormality information.

17 Claims, 7 Drawing Sheets

(58) Field of Classification Search
CPC ....... H04L 67/51; H04L 67/56; G06F 21/552; G06F 21/554
See application file for complete search history.

(56) References Cited

U.S. PATENT DOCUMENTS

| | | | |
|---|---|---|---|
| 2004/0148520 A1 | 7/2004 | Talpade et al. | |
| 2005/0204162 A1* | 9/2005 | Rayes | H04L 63/1433 726/5 |
| 2006/0212572 A1* | 9/2006 | Afek | H04L 63/1491 709/225 |
| 2013/0283379 A1 | 10/2013 | McDysan | |
| 2015/0358348 A1* | 12/2015 | Bartlett | H04L 63/0281 726/12 |
| 2016/0112250 A1* | 4/2016 | Hu | H04L 41/0668 370/216 |
| 2016/0323774 A1* | 11/2016 | Landais | H04W 12/065 |
| 2017/0163679 A1* | 6/2017 | Bartlett | H04L 63/0281 |
| 2017/0251013 A1 | 8/2017 | Kirti et al. | |
| 2020/0053567 A1* | 2/2020 | Monshizadeh | H04W 12/128 |
| 2021/0289015 A1* | 9/2021 | You | H04L 67/1001 |
| 2021/0410059 A1* | 12/2021 | Talebi Fard | H04L 69/24 |

FOREIGN PATENT DOCUMENTS

| | | |
|---|---|---|
| CN | 101789948 A | 7/2010 |
| CN | 101938460 A | 1/2011 |
| CN | 107196791 A | 9/2017 |
| CN | 108702367 A | 10/2018 |
| CN | 108989368 A | 12/2018 |
| WO | 2018106744 A1 | 6/2018 |
| WO | 2018130274 A1 | 7/2018 |

OTHER PUBLICATIONS

NPL Search History (Year: 2024).*
Li, H., et al., Online Orchestration of Cooperative Defense against DDoS Attacks for 5G MEC, IEEE Wireless Communications and Networking Conference (WCNC), 2018, 6 pages.
Bailei, "Research on End-to-End Security Technology of the Internet of Things", Xidian University, Jun. 2017, with an English abstract, total 87 pages.

* cited by examiner

METHOD AND SYSTEM FOR PROVIDING EDGE SERVICE, AND COMPUTING DEVICE

CROSS-REFERENCE TO RELATED APPLICATIONS

This is a continuation of International Patent Application No. PCT/CN2019/130296 filed on Dec. 31, 2019, which claims priority to Chinese Patent Application No. 201910271547.8 filed on Apr. 4, 2019. The disclosures of the aforementioned applications are hereby incorporated by reference in their entireties.

TECHNICAL FIELD

This application relates to the field of computer technologies, and in particular, to a method and a system for providing an edge service, and a computing device.

BACKGROUND

Cloud computing is a computing mode that implements on-demand and convenient use of resources such as computing infrastructures, storage devices, and applications anytime and anywhere over internet. Resources of the cloud computing are centrally deployed in a geographic location. For example, a cloud service provider establishes only several fixed resource areas nationwide, and a plurality of data centers in one resource area provide cloud services for users across the country or even foreign users. A centralized big data processing mode such as the cloud computing may cause high delays in cloud services obtained by a user in some cases. Edge computing is a supplement to the cloud computing. Resources of the edge computing such as computing infrastructures, storage devices, and applications are deployed in data centers close to terminals in a distributed manner, to form a plurality of edge computing device clusters. A method for providing an edge service for a user using an edge computing device cluster effectively resolves the high delay problem.

However, in the conventional technology, in some abnormal cases, for example, when an edge server in the edge computing device cluster encounters a denial-of-service (DOS) attack, or a distributed DOS (DDOS) attack, and when the edge server is almost fully loaded, or a location of a terminal of the user changes, quality of an edge service provided by the edge computing device cluster for the user degrades or the service is interrupted. This provides poor service experience for the user. A problem of how the edge computing device cluster provides a stable edge service for a terminal user in an abnormal case remains to be resolved.

SUMMARY

This application provides a method for providing an edge service, to ensure that an edge computing device cluster provides a stable edge service for a terminal user in an abnormal case.

A first aspect of this application provides a method for providing an edge service, and the method is applied to a system for providing an edge service. The system for providing an edge service includes a security controller and a plurality of edge computing device clusters, and each edge computing device cluster includes at least one security agent and at least one edge server. The method includes a first security agent that performs data stream transmission with a plurality of endpoint computing devices through an edge link, and each endpoint computing device obtains, using the first security agent, an edge service provided by an edge server. The first security agent determines, based on a data stream transmitted between each endpoint computing device and the first security agent, an insecure endpoint computing device in the plurality of endpoint computing devices. The first security agent generates link abnormality information, and the link abnormality information includes an address of the insecure endpoint computing device. The first security agent sends the link abnormality information to the security controller, the security controller receives the link abnormality information, and generates edge link information based on the link abnormality information. The edge link information includes an address of a second security agent. The security controller sends the edge link information to a normal endpoint computing device in the plurality of endpoint computing devices. The method identifies the insecure endpoint computing device using functions of the first security agent and the security controller, and generates the edge link information for the normal endpoint computing device. This ensures that the normal endpoint computing device that is connected to a same security agent is not affected by the insecure endpoint computing device, and improves quality of an edge service obtained by the normal endpoint computing device.

In a possible implementation of the first aspect, that the first security agent determines, based on a data stream transmitted between each endpoint computing device and the first security agent, an insecure endpoint computing device in the plurality of endpoint computing devices includes the first security agent that determines, based on a parameter of the data stream, the insecure endpoint computing device. The parameter of the data stream may be traffic of the data stream in a specific time period, or a variation in the traffic of the data stream in a specific time period. The method determines the insecure endpoint computing device based on the parameter of the data stream, thereby improving efficiency of determining the insecure endpoint computing device.

In a possible implementation of the first aspect, after the security controller receives the link abnormality information, the method further includes the security controller that handles an abnormality on the insecure endpoint computing device based on the link abnormality information, to prevent the insecure endpoint computing device from affecting edge service stability.

In a possible implementation of the first aspect, that the security controller handles an abnormality on the insecure endpoint computing device based on the link abnormality information includes the security controller that rejects a link access request sent by the insecure endpoint computing device. The security controller sends a network termination request to a telecommunications (telco) server, and the network termination request is used to indicate the telco server to stop providing network communication for the insecure endpoint computing device. This fundamentally resolves a threat that the insecure endpoint computing device provides a stable edge service for the edge computing device cluster.

In a possible implementation of the first aspect, the method further includes the normal endpoint computing device that establishes a new edge link with the second security agent based on the edge link information, and performs data stream transmission with the second security agent through the new edge link. According to the method, the normal endpoint computing device continues to obtain, using the second security agent, the edge service provided by the edge server, and is not affected by the insecure endpoint computing device. This optimizes service experience of a user in obtaining the edge service using the endpoint computing device.

In a possible implementation of the first aspect, the edge server and the first security agent may be in a same edge computing device cluster, or may be in different edge computing device clusters.

A second aspect of this application provides a method for providing an edge service, and the method is applied to a system for providing an edge service. The system for providing an edge service includes a security controller and a plurality of edge computing device clusters, and each edge computing device cluster includes at least one security agent and at least one edge server. The method includes a first security agent that performs data stream transmission with a plurality of endpoint computing devices through an edge link, and each endpoint computing device obtains, using the first security agent, an edge service provided by an edge server. The first security agent determines, based on a data stream transmitted between each endpoint computing device and the first security agent, an endpoint computing device with abnormal edge link quality in the plurality of endpoint computing devices, where an edge link is located between the endpoint computing device and the first security agent. The first security agent generates link abnormality information, and the link abnormality information includes an address of the endpoint computing device with abnormal edge link quality. The first security agent sends the link abnormality information to the security controller, the security controller receives the link abnormality information, and generates edge link information based on the link abnormality information. The edge link information includes an address of a second security agent. The security controller sends the edge link information to the endpoint computing device with abnormal edge link quality. The method identifies the endpoint computing device with abnormal edge link quality using the first security agent and the security controller, and provides the edge link information for the endpoint computing device with abnormal edge link quality, so that the endpoint computing device with abnormal edge link quality establishes a normal edge link between the endpoint computing device and the second security agent in time, and continues to obtain a stable edge service.

In a possible implementation of the second aspect, that the first security agent determines, based on a data stream transmitted between each endpoint computing device and the first security agent, an endpoint computing device with abnormal edge link quality in the plurality of endpoint computing devices includes the first security agent that determines, based on a parameter of the data stream, the endpoint computing device with abnormal edge link quality. The method determines the endpoint computing device with abnormal edge link quality based on the parameter of the data stream, and this improves efficiency of determining the endpoint computing device with abnormal edge link quality, and further ensures that the stable edge service is provided for the endpoint computing device with abnormal edge link quality.

In a possible implementation of the second aspect, the method further includes the endpoint computing device with abnormal edge link quality that establishes a new edge link with the second security agent based on the edge link information, and performs data stream transmission with the second security agent through the new edge link. In the method, the endpoint computing device with abnormal edge link quality continues to obtain, using a normal edge link between the endpoint computing device and the second security agent, the edge service provided by the edge server. The method effectively resolves a case in which quality of the edge link is abnormal, and ensures that the stable edge service is provided for the endpoint computing device.

A third aspect of this application provides a system for providing an edge service, the system includes a security controller and a plurality of edge computing device clusters, and each edge computing device cluster includes at least one security agent and at least one edge server. A first security agent is configured to perform data stream transmission with a plurality of endpoint computing devices through an edge link, and each endpoint computing device obtains, using the first security agent, an edge service provided by an edge server. The first security agent is further configured to determine, based on a data stream transmitted between each endpoint computing device and the first security agent, an insecure endpoint computing device in the plurality of endpoint computing devices. The first security agent is further configured to generate link abnormality information, and the link abnormality information includes an address of the insecure endpoint computing device. The first security agent is further configured to send the link abnormality information to the security controller. The security controller is configured to receive the link abnormality information, and generate edge link information based on the link abnormality information. The edge link information includes an address of a second security agent. The security controller is further configured to send the edge link information to a normal endpoint computing device in the plurality of endpoint computing devices.

In a possible implementation of the third aspect, the first security agent is further configured to determine, based on a parameter of the data stream, the insecure endpoint computing device. The parameter of the data stream may be traffic of the data stream in a specific time period, or a variation in the traffic of the data stream in a specific time period.

In a possible implementation of the third aspect, the security controller is further configured to handle an abnormality on the insecure endpoint computing device based on the link abnormality information.

In a possible implementation of the third aspect, the security controller is further configured to reject a link access request sent by the insecure endpoint computing device, and send a network termination request to a telco server. The network termination request is used to indicate the telco server to stop providing network communication for the insecure endpoint computing device.

In a possible implementation of the third aspect, the normal endpoint computing device is configured to establish a new edge link with the second security agent based on the edge link information, and perform data stream transmission with the second security agent through the new edge link.

A fourth aspect of this application provides a system for providing an edge service, the system includes a security controller and a plurality of edge computing device clusters, and each edge computing device cluster includes at least one security agent and at least one edge server. A first security agent is configured to perform data stream transmission with a plurality of endpoint computing devices through an edge link, and each endpoint computing device obtains, using the first security agent, an edge service provided by an edge server. The first security agent is further configured to determine, based on a data stream transmitted between each endpoint computing device and the first security agent, an endpoint computing device with abnormal edge link quality in the plurality of endpoint computing devices where an edge link is located between the endpoint computing device and the first security agent. The first security agent is further configured to generate link abnormality information, and the link abnormality information includes an address of the endpoint computing device with abnormal edge link quality. The first security agent is further configured to send the link abnormality information to the security controller. The security controller is configured to receive the link abnormality information, and generate edge link information based on the link abnormality information. The edge link information includes an address of a second security agent. The security controller is further configured to send the edge link information to the endpoint computing device with abnormal edge link quality.

A fifth aspect of this application provides a method for providing an edge service, and the method includes a security controller that receives link access requests sent by a plurality of endpoint computing devices. The security controller sends first edge link information to each endpoint computing device in the plurality of endpoint computing devices, and the first edge link information includes an address of a first security agent. The security controller receives link abnormality information sent by the first security agent, and the link abnormality information includes an address of an insecure endpoint computing device in the plurality of endpoint computing devices. The security controller generates second edge link information based on the link abnormality information, and the second edge link information includes an address of a second security agent.

In a possible implementation of the fifth aspect, the method further includes the security controller that handles an abnormality on the insecure endpoint computing device based on the link abnormality information.

In a possible implementation of the fifth aspect, the handling an abnormality on the insecure endpoint computing device based on the link abnormality information includes rejecting a link access request sent by the insecure endpoint computing device, and sending a network termination request to a telco server. The network termination request is used to indicate the telco server to stop providing network communication for the insecure endpoint computing device.

In a possible implementation of the fifth aspect, the method further includes the security controller that sends the edge link information to a normal endpoint computing device in the plurality of endpoint computing devices.

A sixth aspect of this application provides a method for providing an edge service, and the method includes a security controller that receives link access requests sent by a plurality of endpoint computing devices. The security controller sends first edge link information to each endpoint computing device in the plurality of endpoint computing devices, and the first edge link information includes an address of a first security agent. The security controller receives link abnormality information sent by the first security agent, and the link abnormality information includes an address of an endpoint computing device with abnormal edge link quality in the plurality of endpoint computing devices. The security controller generates second edge link information based on the link abnormality information, and the second edge link information includes an address of a second security agent.

In a possible implementation of the sixth aspect, the method further includes sending the edge link information to the endpoint computing device with abnormal edge link quality.

A seventh aspect of this application provides a computing device, and the computing device includes a memory and a processor. The processor is configured to read computer instructions stored in the memory to receive link access requests sent by a plurality of endpoint computing devices, send first edge link information to each endpoint computing device in the plurality of endpoint computing devices, where the first edge link information includes an address of a first security agent, receive link abnormality information sent by the first security agent, where the link abnormality information includes an address of an insecure endpoint computing device in the plurality of endpoint computing devices, and generate second edge link information based on the link abnormality information, where the second edge link information includes an address of a second security agent.

In a possible implementation of the seventh aspect, the computing device is further configured to handle an abnormality on the insecure endpoint computing device based on the link abnormality information.

In a possible implementation of the seventh aspect, the handling an abnormality on the insecure endpoint computing device based on the link abnormality information includes rejecting a link access request sent by the insecure endpoint computing device, and sending a network termination request to a telco server. The network termination request is used to indicate the telco server to stop providing network communication for the insecure endpoint computing device.

In a possible implementation of the seventh aspect, the computing device is further configured to send the edge link information to a normal endpoint computing device in the plurality of endpoint computing devices.

An eighth aspect of this application provides a computing device, and the computing device includes a memory and a processor. The processor is configured to read computer instructions stored in the memory to receive link access requests sent by a plurality of endpoint computing devices, send first edge link information to each endpoint computing device in the plurality of endpoint computing devices, where the first edge link information includes an address of a first security agent, receive link abnormality information sent by the first security agent, where the link abnormality information includes an address of an endpoint computing device with abnormal edge link quality in the plurality of endpoint computing devices, and generate second edge link information based on the link abnormality information, where the second edge link information includes an address of a second security agent.

In a possible implementation of the eighth aspect, the computing device is further configured to send the edge link information to the endpoint computing device with abnormal edge link quality.

A ninth aspect of this application provides a computing device, and the computing device includes a memory and a processor. The memory is configured to store computer instructions, and the processor is configured to read the computer instructions stored in the memory to perform data stream transmission with a plurality of endpoint computing devices through an edge link, determine, based on a data stream transmitted between and processor and the plurality of endpoint computing devices, an abnormal endpoint computing device in the plurality of endpoint computing devices, and generate link abnormality information, where the link abnormality information includes an address of the abnormal endpoint computing device, send the link abnormality information to a security controller, forward, to an edge server, a data flow sent by a normal endpoint computing device in the plurality of endpoint computing devices, and receive a data flow sent by the edge server and send the data stream to the normal endpoint computing device in the plurality of endpoint computing devices.

A tenth aspect of this application provides a computer-readable storage medium, and the computer-readable storage medium stores computer instructions. When the computer instructions are executed by a computing device, the computing device performs the method in any one of the fifth aspect or possible implementations of the fifth aspect.

An eleventh aspect of this application provides a computer-readable storage medium, and the computer-readable storage medium stores computer instructions. When the computer instructions are executed by a computing device, the computing device performs the method in any one of the sixth aspect or possible implementations of the sixth aspect.

A twelfth aspect of this application provides a computer-readable storage medium, and the computer-readable storage medium stores computer instructions. When the computer instructions are executed by a computing device, the computing device performs the actions executed by the computing device in the ninth aspect.

A thirteenth aspect of this application provides a computer program product, and the computer program product includes computer program code. When the computer program code is run on a computer, the computer performs the method in any one of the fifth aspect or possible implementations of the fifth aspect.

A fourteenth aspect of this application provides a computer program product, and the computer program product includes computer program code. When the computer program code is run on a computer, the computer performs the method in any one of the sixth aspect or possible implementations of the sixth aspect.

A fifteenth aspect of this application provides a computer program product, and the computer program product includes computer program code. When the computer program code is run on a computer, the computer performs the actions executed by the computing device in the ninth aspect.

DESCRIPTION OF EMBODIMENTS

The following describes the solutions in the embodiments provided in this application with reference to the accompanying drawings in this application.

With development of cloud computing and edge computing, there is a mode of using resources of a cloud computing device cluster and an edge computing device cluster to jointly provide a service for a user (for example, in an architecture of a cloud game based on the edge computing, a game rendering server in the edge computing device cluster is responsible for rendering a game picture, and a game data server in the cloud computing device cluster is responsible for basic game logic, user data, service processing, and the like) in the industry. There is also a mode of providing a service for a user only using the resource of the edge computing device cluster (for example, a voice recognition server in the edge computing device cluster receives a voice signal sent by an endpoint computing device, to provide a real-time voice recognition service for the user) in the industry.

In this application, an edge service is a service provided for a user using a resource of at least one edge server in an edge computing cluster. This application provides a method for providing an edge service, and the method may quickly respond when a security agent in an edge computing device cluster is attacked or quality of an edge link between an endpoint computing device of a user and the security agent is abnormal, to implement edge link reconnection, and ensure that a system can continue to provide a high-quality edge service for the user. In this application, an edge link is a path on which the user performs data stream transmission using the endpoint computing device and the security agent in the edge computing device cluster, and the edge link may be a wireless link, a wired link, or a combination of a wired link and a wireless link. A data stream refers to data of a request, a response, information, or the like transmitted on a network, for example, an edge service request or an edge service response.

Figure 1:
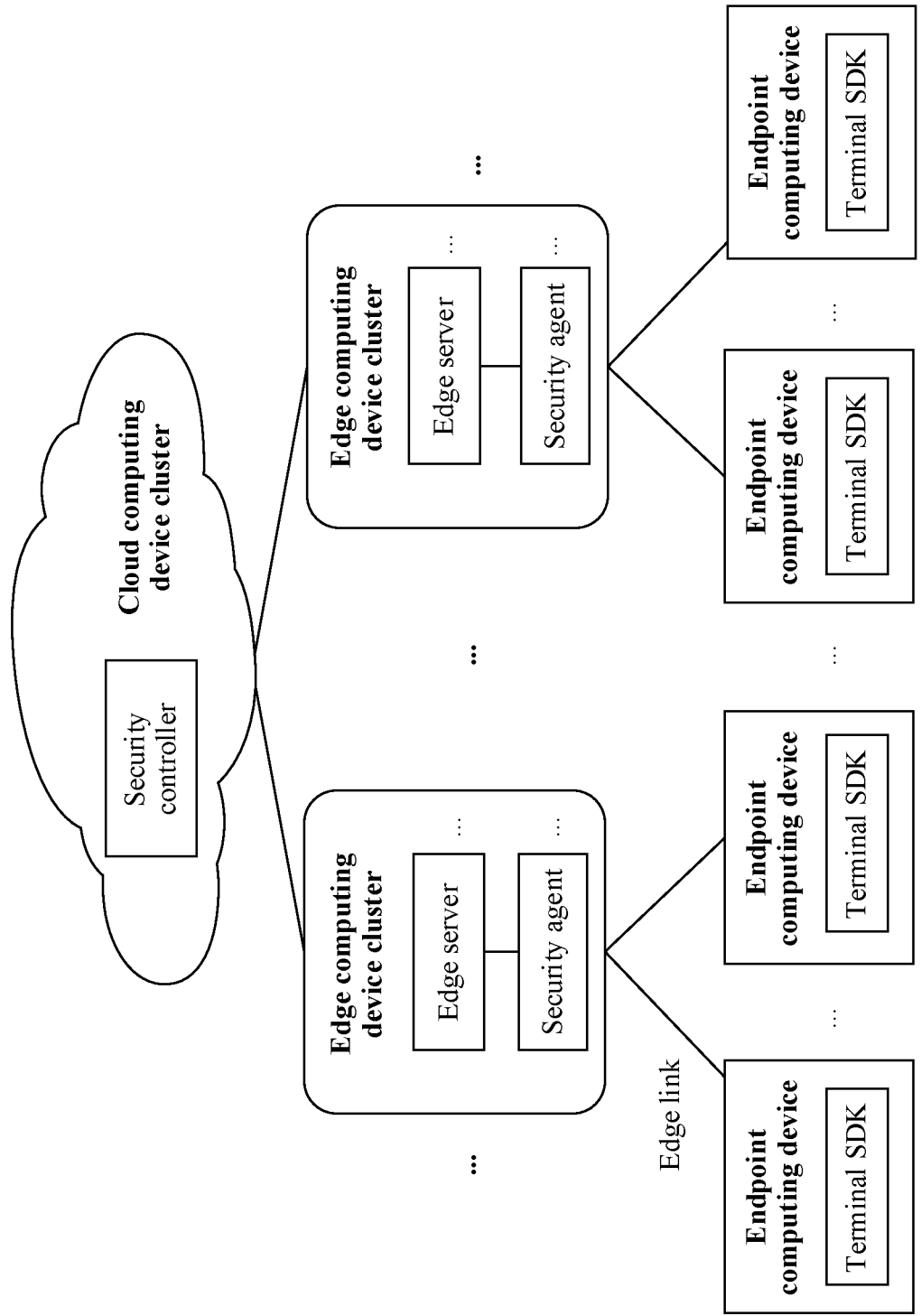
FIG. 1 is a schematic diagram of a system architecture according to this application.

FIG. 1 is a schematic diagram of a system architecture according to an embodiment of this application. The system architecture includes a cloud computing device cluster, at least one edge computing device cluster, and at least one endpoint computing device. The cloud computing device cluster is a computing device cluster that provides a computing resource, a storage resource, and a network resource. The computing device cluster is usually centralized in a physical location, and may be provided by a cloud service provider and leased by a user. For example, the cloud service provider establishes only several fixed resource areas nationwide, and one resource area includes a plurality of data centers. The cloud service provider provides a cloud service for users all over the country or even for foreign users. The edge computing device cluster is a computing device cluster that is close to an endpoint computing device within a specific physical scope and that is configured to provide a computing resource, a storage resource, and a network resource. The edge computing device cluster is usually smaller in scale and larger in quantity than the cloud computing device cluster. An edge server and an application in the edge computing device cluster are distributed in a data center within the specific physical scope, and provide an edge service for the endpoint computing devices within the scope. The endpoint computing device includes but is not limited to a smartphone, a smart camera, a smart watch, a smart printer, a camera, a portable computer, a desktop computer, or the like.

As shown in FIG. 1, a terminal software development kit (SDK) is deployed on the endpoint computing device, and the terminal SDK is used to enable the endpoint computing device to perform data communication with the edge computing device cluster or the cloud computing device cluster, so that the user obtains an edge service or a cloud service using the endpoint computing device. The terminal SDK sends a link access request to a security controller deployed in the cloud computing device cluster to obtain a link for using the edge service. The security controller allocates and deploys a security agent and the edge server in the edge computing device cluster for the terminal SDK, and provides edge link information for the user. The edge link information includes an address of the security agent. The security controller and the edge server may be physical computing devices or virtual computing devices. In this application, the security agent is a virtual computing device (for example, a virtual machine or a software module that runs on the physical computing device), and the security agent may be deployed on any physical device in the edge computing device cluster. For example, the security agent may run on the edge server, or runs on a same physical computing device as that of the edge server.

In this application, the terminal SDK may be deployed on hardware of the endpoint computing device, in an operating system of the endpoint computing device, or in specific software downloaded by the endpoint computing device. The terminal SDK may be a software package.

The security controller located in the cloud computing device cluster has functions of managing and monitoring edge links and the security agent and the edge server in the edge computing device cluster. When the security controller receives link abnormality information sent by the security agent or the security controller monitors that the edge link is abnormal, the security controller regenerates edge link information based on monitored resource utilization or other working status-related parameters of another security agent and another edge server in the edge computing device cluster, and location information of the terminal SDK. Alternatively, the security controller may be deployed in one or more edge computing device clusters.

It should be understood that, in the system architecture, the terminal SDK in the endpoint computing device may establish a communication connection with the security agent in the edge computing device cluster and the security controller in the cloud computing device cluster, and the security agent and the edge server may establish a communication connection with the security controller. Usually, the edge server does not directly establish a communication connection with the terminal SDK, but implements data communication and transmission with the terminal SDK using the security agent. The security agent is used to forward, to the edge server, a data stream sent by the terminal SDK, and is also used to forward, to the terminal SDK, a data stream sent by the edge server. The system architecture makes the edge server more stable. When the terminal SDK attacks the edge computing device cluster, an attack data stream or a sudden change data stream from the terminal SDK does not directly affect the edge server, but first reaches the security agent. This ensures quality stability of the edge service provided by the edge server for the user.

It should be understood that, in the system architecture, the security controller may manage at least one edge computing device cluster, and further manage a security agent and an edge server in the at least one edge computing device cluster. One edge computing device cluster includes at least one security agent and at least one edge server. A communication connection between the security agent and the edge server may be a one-to-many or many-to-one relationship, that is, one security agent may be in a communication connection with a plurality of edge servers, or one edge server may be in a communication connection with a plurality of security agents. A communication connection between the endpoint computing device and the security agent in the edge computing device cluster may also be a one-to-many or many-to-one relationship, that is, one endpoint computing device may be in a communication connection with a plurality of security agents, or one security agent may be in a communication connection with a plurality of endpoint computing devices. The system architecture effectively ensures load balancing of the edge computing device cluster.

Figure 2:
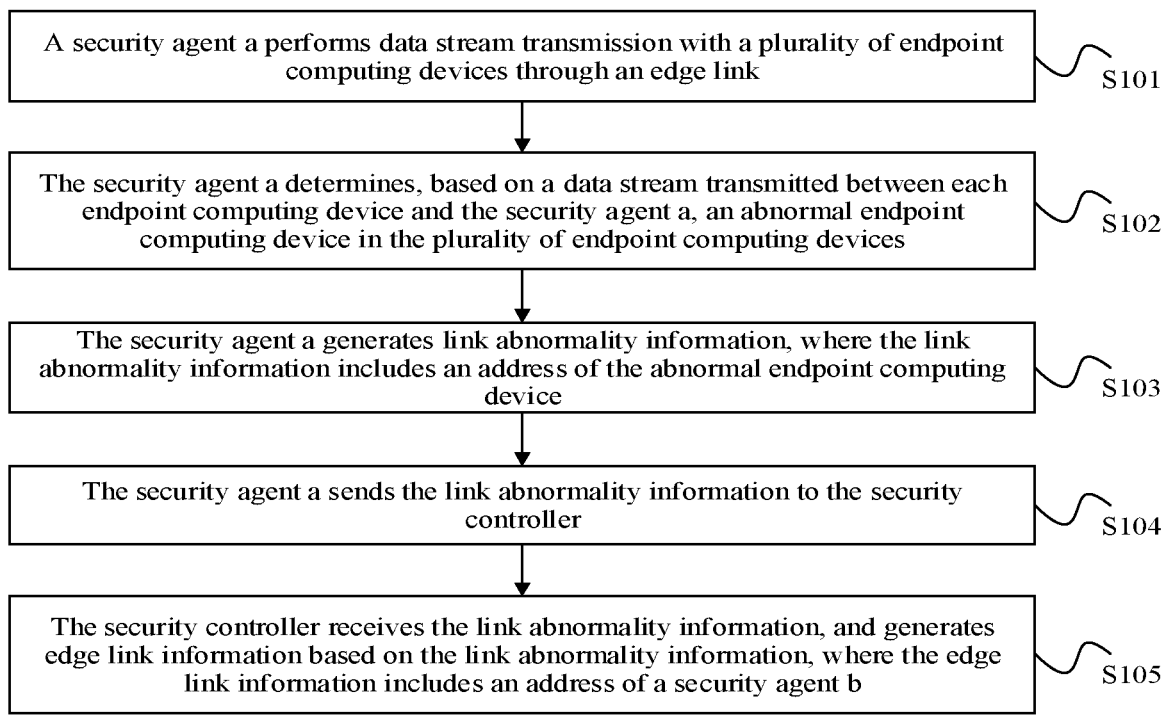
FIG. 2 is a schematic flowchart of a method for providing an edge service according to this application.

This application provides a method for providing an edge service, and the method is run on a system for providing an edge service. The system for providing an edge service is a system including a security controller and a plurality of edge computing device clusters, and each edge computing device cluster includes at least one security agent and at least one edge server. The method for providing an edge service in this application can resolve a problem that quality of an edge service provided by the system for providing an edge service for an endpoint computing device greatly degrades or the edge service is interrupted in an abnormal case, and ensure that the system for providing an edge service can still provide a stable edge service for the endpoint computing device in the abnormal case. As shown in FIG. 2, a procedure of the edge service providing method is as follows.

S101: A security agent A performs data stream transmission with a plurality of endpoint computing devices through an edge link.

Further, each endpoint computing device obtains, using the security agent A, an edge service provided by an edge server.

S102: The security agent A determines, based on a data stream transmitted between each endpoint computing device and the security agent A, an abnormal endpoint computing device in the plurality of endpoint computing devices.

Optionally, step S102 may include the security agent A that determines, based on a parameter of the data stream, the abnormal endpoint computing device. The abnormal endpoint computing device is an insecure endpoint computing device in the plurality of endpoint computing devices. The parameter of the data stream may be traffic of a data stream, that is, traffic of a data stream that is sent by the endpoint computing device and that is received by the security agent A within a specific time period.

Optionally, step S102 may alternatively include the security agent that determines, based on a parameter of the data stream, the abnormal endpoint computing device. Quality of an edge link between the abnormal endpoint computing device and the first security agent is abnormal. The parameter of the data stream may be traffic of a data stream, that is, traffic of a data stream that is sent by the endpoint computing device and that is received by the security agent A within a specific time period.

S103: The security agent A generates link abnormality information, where the link abnormality information includes an address of the abnormal endpoint computing device.

S104: The security agent A sends the link abnormality information to the security controller.

S105: The security controller receives the link abnormality information, and generates edge link information based on the link abnormality information. The edge link information includes an address of a security agent B.

It should be noted that the security agent A and the security agent B may be in a same edge computing device cluster in the system for providing edge service, or may be in different edge computing device clusters in the system for providing an edge service.

Optionally, when the abnormal endpoint computing device is an insecure endpoint computing device in the plurality of endpoint computing devices, the method for providing an edge service further includes the security controller that handles an abnormality on the abnormal endpoint computing device based on the link abnormality information. The abnormal handling includes the security controller that rejects a link access request sent by the abnormal endpoint computing device, and sends a network termination request to a telco server. The network termination request is used to indicate the telco server to stop providing network communication for the abnormal endpoint computing device.

Optionally, when the abnormal endpoint computing device is an insecure endpoint computing device in the plurality of endpoint computing devices, after step S105 is performed, the following steps may further be performed. The security controller sends the edge link information to a normal endpoint computing device in the plurality of endpoint computing devices. The normal endpoint computing device establishes a new edge link with the security agent B based on the edge link information, and performs data stream transmission with the security agent B through the new edge link.

Optionally, when the quality of the edge link between the abnormal endpoint computing device and the security agent A is abnormal, after step S105 is performed, the following steps may further be performed. The security controller sends the edge link information to the abnormal endpoint computing device.

The abnormal endpoint computing device establishes a new edge link with the security agent B based on the edge link information, and performs data stream transmission with the security agent B through the new edge link.

The following describes two abnormal cases of the abnormal endpoint computing device.

1. The abnormal endpoint computing device is an insecure endpoint computing device in the plurality of endpoint computing devices.

Further, an attacker uses a terminal SDK in the endpoint computing device to initiate an abnormal attack on a security agent in an edge computing device cluster. The security controller receives link abnormality information sent by the terminal SDK or the security agent, and the security controller processes the abnormal case based on the link abnormality information and makes a reconnection decision (change an edge link) for another normal endpoint computing device connected to the same security agent as that of the insecure endpoint computing device. In this case, traffic of a data stream between the attacked security agent and the terminal SDK used by the attacker surges and is higher than a normal level.

2. Quality of an edge link between the abnormal endpoint computing device and the security agent is abnormal. When the security controller detects that the quality of the edge link between the endpoint computing device and the security agent is abnormal or receives link abnormality information that indicates that the quality of the edge link is abnormal and that is sent by the security agent, the security controller makes a reconnection decision for the endpoint computing device with abnormal edge link quality. In this case, traffic of a data stream between the security agent and a terminal SDK corresponding to the endpoint computing device with abnormal edge link quality usually decreases and is lower than a normal level.

For example, a cause of the case 1 may be The attacker uses the terminal SDK in the endpoint computing device to initiate a DOS attack or a DDOS attack on a security agent in an edge computing device cluster, and the terminal SDK or the security agent detects that the traffic of the data stream of the edge link is abnormal (the traffic surges) and sends the link abnormality information to the security controller.

Both the DOS attack and the DDOS attack are attack manners of occupying a resource of a target computing device. An attacker sends a large quantity of requests to the target computing device in a short time. Because the resource of the target computing device is occupied by the request sent by the attacker, the target computing device rejects a request from a common user, and cannot provide a service for the common user. A difference between the DOS attack and the DDOS attack is that in the DOS attack, the attacker only uses a computing device of the attacker to attack the target computing device, and in the DDOS attack, the attacker uses one computing device to control a plurality of computing devices to attack the target computing device together.

For example, a cause of the case 2 may be because an endpoint computing device connected to an edge computing device cluster moves in physical space, a physical distance between the endpoint computing device and the connected security agent and the connected edge server in the edge computing device cluster becomes longer. As a result, quality of the edge link is abnormal. Alternatively, because a security agent or an edge server in an edge computing device cluster is almost fully loaded, quality of edge links of some endpoint computing devices degrades.

In this application, Embodiment 1 and Embodiment 2 of the corresponding method for providing an edge service are respectively described based on the foregoing case 1 and case 2.

Figure 3A:
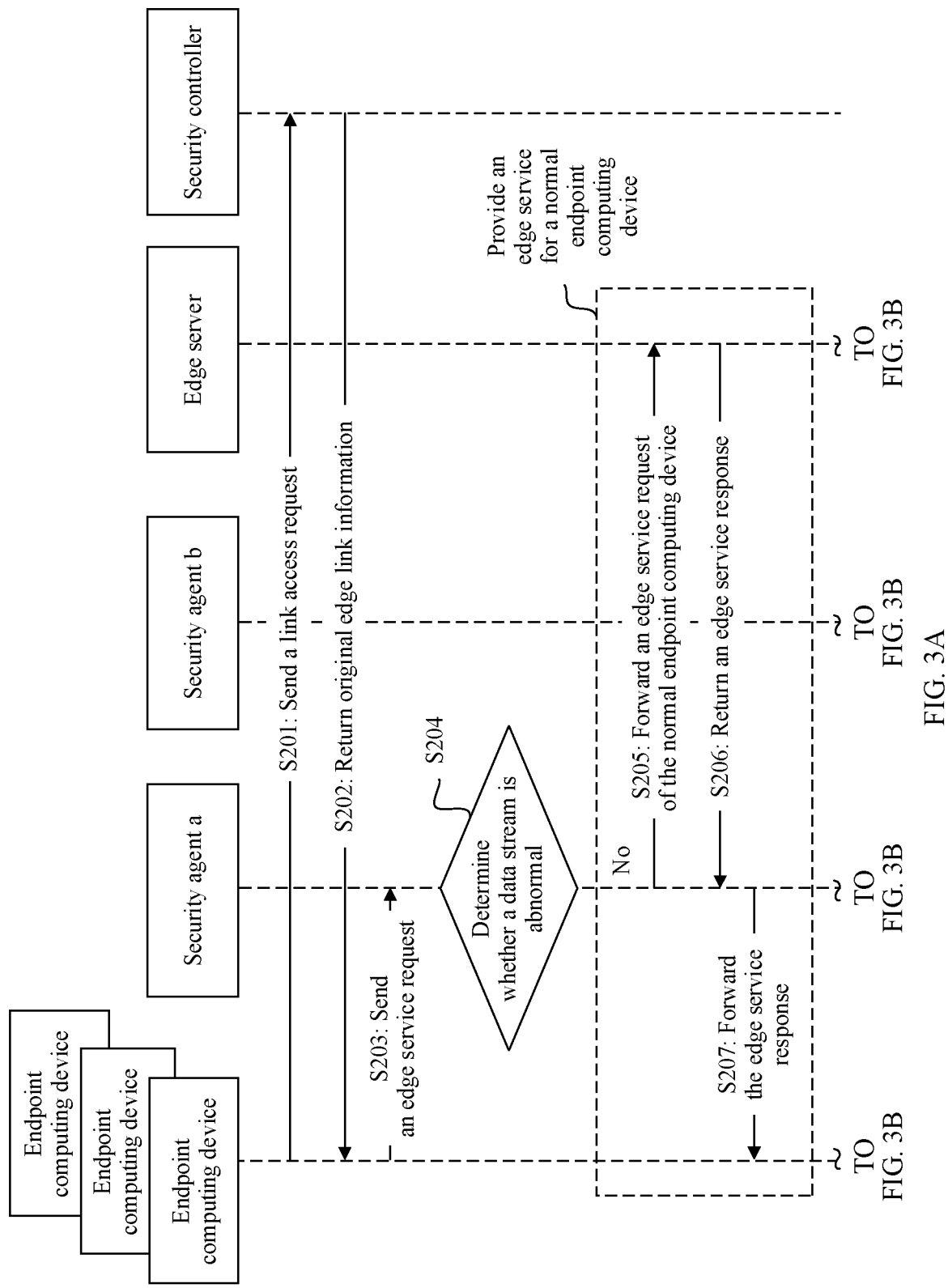
FIGS. 3A and 3B are schematic flowcharts of a method for providing an edge service according to an embodiment of this application.
Figure 3B:
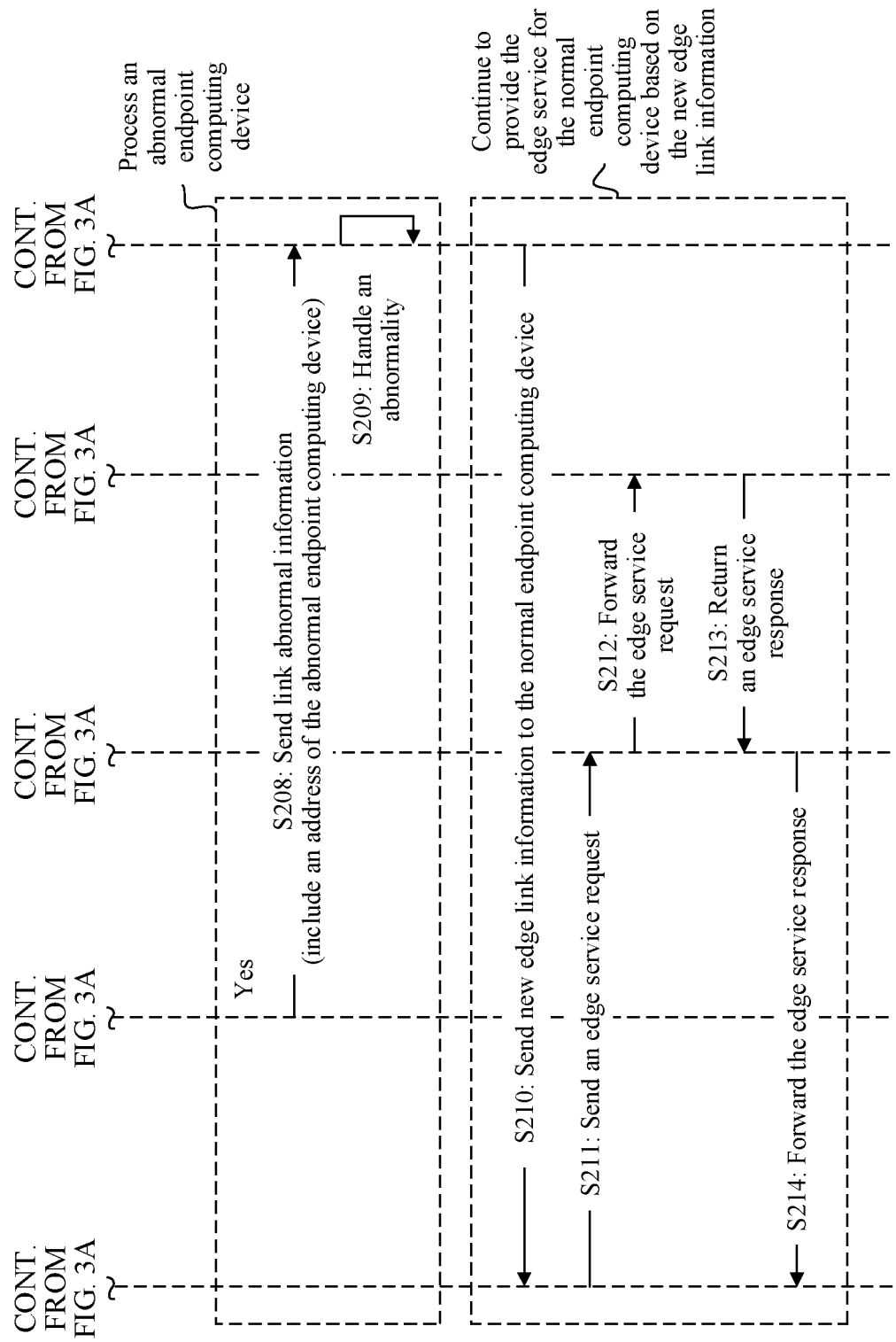

The following describes the Embodiment 1 of this application in detail with reference to FIGS. 3A and 3B.

S201: The plurality of endpoint computing devices sends link access requests to the security controller.

Further, a user performs an operation of accessing the edge service on the endpoint computing device. For example, the user logs in to an application installed on the endpoint computing device using an account and a password, the terminal SDK in the endpoint computing device generates a link access request based on user information and the user operation of accessing the edge service, and the terminal SDK sends the link access request to the security controller. The link access request includes an Internet Protocol (IP) address of the endpoint computing device corresponding to the terminal SDK.

It should be understood that in step S201, terminal SDKs in the plurality of endpoint computing devices send link access requests to the security controller for a same edge service in a same time period. The link access requests sent by the plurality of endpoint computing devices may include a link access request sent by a normal endpoint computing device of the common user and a link access request sent by the abnormal endpoint computing device controlled by the attacker.

S202: The security controller returns original edge link information to the plurality of endpoint computing devices based on the link access requests sent by the plurality of endpoint computing devices.

Further, the security controller receives the link access requests sent by the terminal SDKs in the plurality of endpoint computing devices, and obtains in advance, based on the IP address of the endpoint computing device that is carried in the link access requests, one or more pieces of information of an IP address of the security agent in the edge computing device cluster, an IP address of the edge server, the edge link information recorded in the security controller, resource utilization of each security agent, and resource utilization of each edge server, to allocate the security agent A and the edge server for the plurality of endpoint computing devices. Generally, the security agent A is relatively close in a physical location to the endpoint computing device that sends the link access request, and has stable performance. The security controller returns the original edge link information for obtaining the edge service to the terminal SDKs in the plurality of endpoint computing devices. The edge link information includes any one or more of the following: an IP address of the security agent A, allocated to the endpoint computing device, the IP address of the edge server, a port number of the security agent A, a port number of the edge server, indication information of a connection between the endpoint computing device and the security agent A, and the like.

Optionally, some information (for example, the IP address of the edge server and the port number of the edge server) in the edge link information may be encrypted by the security controller, and the security controller returns edge link information including an encrypted ciphertext to the terminal SDK.

It should be understood that step S201 and step S202 are steps that need to be performed when the user first accesses the edge service or when the user re-accesses the edge service after accessing the edge service for a time period. After step S201 and step S202 are performed, in a specific time period, the user may repeatedly perform, based on the original edge link information, step S203 and subsequent steps to obtain the edge service.

S203: The plurality of endpoint computing devices sends an edge service request to the security agent A based on the original edge link information.

In step S203, in a same time period, the plurality of endpoint computing devices sends the edge service request to the security agent A based on the foregoing original edge link information. The edge service request sent by the plurality of endpoint computing devices may include an edge service request sent by a terminal SDK corresponding to the normal endpoint computing device of the common user and an edge service request sent by a terminal SDK in the abnormal endpoint computing device controlled by the attacker.

Optionally, a terminal SDK in each endpoint computing device monitors a data stream sent by the terminal SDK to the security agent A. If the terminal SDK finds that the data stream of the terminal SDK is abnormal, for example, traffic of an edge service request sent within a specific time period surges, the terminal SDK in the endpoint computing device sends link abnormality information to the security controller. The link abnormality information includes at least an IP address of the endpoint computing device corresponding to the terminal SDK.

S204: The security agent A receives the edge service request sent by the plurality of endpoint computing devices, and determines whether traffic of the data stream sent by the terminal SDK in each endpoint computing device is abnormal. If it is determined that the traffic of the data stream is not abnormal, the security agent A determines that the endpoint computing device is a normal endpoint computing device, and a procedure goes to step S205. If it is determined that the traffic of the data stream is abnormal, it is determined that the security agent A, encounters an abnormal attack, the security agent A determines that the endpoint computing device is an abnormal endpoint computing device, and the procedure goes to step S208.

For example, a method for determining, by the security agent A, whether traffic of a data stream sent by the endpoint computing device is abnormal may be that the security agent A determines, based on a relationship between traffic of a data stream sent by the endpoint computing device per unit of time and a threshold preset by the security agent A. When the traffic of the data stream sent by the endpoint computing device per unit of time is greater than the threshold, the traffic of the data stream is determined to be abnormal. Otherwise, the traffic of the data stream is determined to be not abnormal.

It should be understood that the security agent A may receive, in a same time period, an edge service request sent by at least one terminal SDK, and determine traffic sent by each terminal SDK.

S205: When traffic sent by the endpoint computing device is not abnormal, the security agent A, forwards, to the edge server, the edge service request sent by the endpoint computing device.

Further, the security agent A, forwards the edge service request to the edge server based on information that is about the IP address and the port number of the edge server and that is carried in the edge service request.

Optionally, the information that is about the IP address and the port number of the edge server and that is carried in the edge service request may be an encrypted ciphertext, and the security agent A, decrypts the ciphertext according to a decryption algorithm to obtain the IP address and the port number of the edge server.

S206: The edge server receives the edge service request, generates an edge service response based on the edge service request, and returns the edge service response to the security agent A.

S207: The security agent A receives the edge service response, and forwards the edge service response to a corresponding endpoint computing device.

For a normal endpoint computing device corresponding to a terminal SDK sending traffic that is not abnormal, a complete procedure of obtaining the edge service has been completed from step S201 to step S207.

Optionally, after S205, the edge server may directly send the edge service response to the endpoint computing device.

S208: When traffic sent by the endpoint computing device is abnormal, that is, the security agent A, encounters an abnormal attack, the security agent A sends the link abnormality information to the security controller.

Further, the link abnormality information may include any one or more of the following: an IP address of the abnormal endpoint computing device, the IP address of the security agent A, abnormal time data, geographic location data, an abnormal parameter (for example, traffic and a peak per unit of time), and information of a normal endpoint computing device connected to the currently attacked security agent A.

S209: The security controller receives the link abnormality information, and handles an abnormality based on the link abnormality information.

Handling an abnormality includes any one or more of the following: recording an IP address of an abnormal endpoint computing device that establishes a connection with the security agent A, rejecting a new link access request sent by a terminal SDK in the abnormal endpoint computing device, and no longer providing, by the security controller, new edge link information for the terminal SDK in the abnormal endpoint computing device, and sending a network termination request for the IP address of the abnormal endpoint computing device to the telco server, so that the abnormal endpoint computing device cannot perform network communication.

It should be understood that the link abnormality information received by the security controller may be sent by the security agent A, in step S208, or may be sent by the abnormal endpoint computing device. In an optional solution, both the terminal SDK in the abnormal endpoint computing device and the security agent A send link abnormality information, the security controller receives the link abnormality information that first arrives (may be sent by the terminal SDK in the abnormal endpoint computing device, or may be sent by the security agent a), and handles an abnormality based on the received link abnormality information.

It should be understood that a plurality of abnormality handling operations performed by the security controller are not subject to a specific sequence.

Optionally, the security controller may further perform an operation such as reclaiming a resource, allocating an elastic IP address, or restarting on the security agent A.

S210: The security controller sends the new edge link information to a terminal SDK corresponding to the normal endpoint computing device connected to the security agent A, where the normal endpoint computing device connected to the security agent A is another normal endpoint computing device in the plurality of endpoint computing devices that is connected to the same security agent A as that of the insecure endpoint computing device in a time period.

The security controller reallocates the security agent B (or reallocates the security agent B and a new edge server) to the normal endpoint computing device connected to the security agent A. Usually, the reallocated security agent B is closer to the normal endpoint computing device and has stable performance. The security controller generates new edge link information, and the new edge link information includes any one or more of the following: an IP address and a port number of the security agent B, an IP address and a port number of the edge server, indication information of a connection between the endpoint computing device, and the security agent B and the edge server.

Optionally, some information (for example, the IP address of the edge server and the port number of the edge server) in the new edge link information may be encrypted by the security controller, and the security controller returns new edge link information including the encrypted ciphertext to the terminal SDK corresponding to the normal endpoint computing device.

It should be noted that information of the edge server (for example, the IP address of the edge server and the port number of the edge server) included in the new edge link information sent by the security controller to the normal endpoint computing device may be the same as that of the edge server that originally provides the edge service for the normal endpoint computing device (that is, the edge server indicated by the original edge link information is the same as the edge server indicated by the new edge link information), or may be information of one of other edge servers that belong to a same edge computing device cluster as the original edge server, or may be information of an edge server in another edge computing device cluster whose physical location is closer to the endpoint computing device (that is, the new edge link information indicates a new edge server).

It should be noted that the security agent B reallocated by the security controller may be another security agent that belongs to the same edge computing device cluster as that of the security agent A, or a security agent in another edge computing device cluster whose physical location is closer to the endpoint computing device.

Optionally, a sequence of performing the foregoing steps S210 and S209 is not limited.

Optionally, the step S210 may alternatively be performed after the security controller sends a reconnection command to the terminal SDK corresponding to the normal endpoint computing device connected to the security agent A, and after the normal endpoint computing device that receives the reconnection command sends a reconnection request to the security controller.

S211: The normal endpoint computing device sends an edge service request to the security agent B.

After receiving the new edge link information, the terminal SDK corresponding to the normal endpoint computing device sends the edge service request to the security agent B based on the new edge link information.

S212: The security agent B receives the edge service request sent by the normal endpoint computing device, and forwards the edge service request to the edge server.

Optionally, the security agent B may perform an operation performed by the security agent A in the step S204, and perform the step S212 when determining that traffic sent by the normal endpoint computing device is not abnormal.

S213: The edge server receives the edge service request, generates an edge service response based on the edge service request, and returns the edge service response to the security agent B.

S214: The security agent B receives the edge service response, and forwards the edge service response to the normal endpoint computing device.

Optionally, after S213, the edge server may directly send the edge service response to the endpoint computing device.

It should be noted that, the steps S201 to S203 are same operations performed on the plurality of endpoint computing devices. The step S204 performs an operation of determining whether traffic of a data stream sent by the terminal SDK in each endpoint computing device in the plurality of endpoint computing devices is abnormal. If the traffic is determined to be not abnormal, the steps S205 to S207 are performed on the edge service request sent by the normal endpoint computing device. If the traffic is determined to be abnormal, the steps S208 to S210 are performed on the edge service request sent by the abnormal endpoint computing device. The steps S205 to S207 and S208 to S210 may be performed at the same time. After S210 is performed, no operation is performed on the abnormal endpoint computing device, and the steps S211 to S214 are performed on all normal endpoint computing devices that obtain the new edge link information.

The foregoing method for providing an edge service ensures that in a case in which there is an abnormal endpoint computing device (an endpoint computing device controlled by an attacker to initiate abnormal attack on a security agent connected to the endpoint computing device) in a plurality of endpoint computing devices connected to a same security agent, new edge link information is quickly sent to another normal endpoint computing device connected to the security agent, to ensure that the normal endpoint computing device continues to provide a high-quality edge service for a user.

This method improves quality of the edge service obtained by the endpoint computing device, and provides good service experience for the user.

Figure 4:
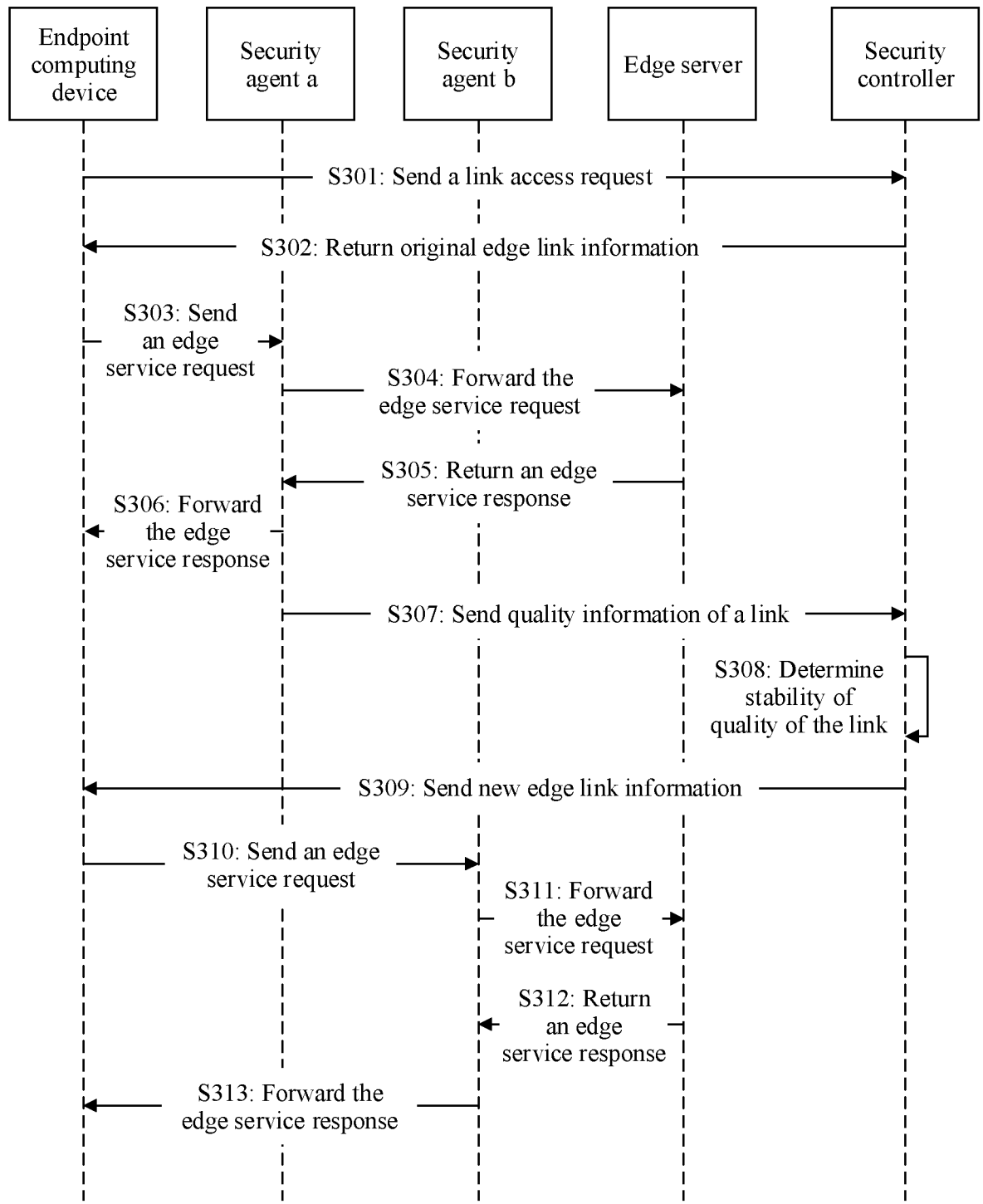
FIG. 4 is a schematic flowchart of a method for providing an edge service according to another embodiment of this application.

The following describes Embodiment 2 of this application in detail with reference to FIG. 4.

S301: The endpoint computing device sends a link access request to the security controller.

Further, a user performs an operation of accessing the edge service on the endpoint computing device. For example, the user logs in to an application installed on the endpoint computing device using an account and a password, the terminal SDK in the endpoint computing device generates the link access request based on user information and the user operation of accessing the edge service, and the terminal SDK sends the link access request to the security controller. The link access request includes an IP address of the endpoint computing device corresponding to the terminal SDK.

S302: The security controller returns original edge link information to the endpoint computing device based on the link access request sent by the endpoint computing device.

Further, the security controller receives the link access request sent by the terminal SDK in the endpoint computing device, and obtains in advance, based on the IP address of the endpoint computing device that is carried in the link access request, an IP address of the security agent in the edge computing device cluster, an IP address and a status of the edge server, and the edge link information recorded in the security controller, to allocate, to the endpoint computing device, the security agent A and the edge server whose physical locations are closer to the endpoint computing device and that have stable performance. The security controller returns edge link information of the edge service obtained by the user using the endpoint computing device to the terminal SDK. The edge link information includes any one or more of the following an IP address of the security agent A, an IP address of the edge server, a port number of the security agent A, a port number of the edge server, and indication information of a connection between the endpoint computing device and the security agent A.

Optionally, some information (for example, the IP address of the edge server and the port number of the edge server) in the edge link information may be encrypted by the security controller, and the security controller returns edge link information including the encrypted ciphertext to the terminal SDK.

It should be understood that step S301 and step S302 are steps that need to be performed when the user first accesses the edge service or when the user re-accesses the edge service after the user is disconnected. After step S301 and step S302 are performed, in a specific time period, the user may repeatedly perform step S303 and subsequent steps to obtain the edge service.

S303: The endpoint computing device sends an edge service request to the security agent A based on the original edge link information.

S304: The security agent A receives the edge service request sent by the endpoint computing device, and forwards the edge service request to the edge server.

S305: The edge server receives the edge service request, generates an edge service response based on the edge service request, and returns the edge service response to the security agent A.

S306: The security agent A receives the edge service response, and forwards the edge service response to the endpoint computing device.

Optionally, after S304, the edge server may directly send the edge service response to the endpoint computing device.

S307: The security agent A sends quality information of an edge link between the security agent A and the endpoint computing device to the security controller.

Further, the security agent A monitors quality of the edge link between the security agent A and the connected endpoint computing device, and periodically sends the monitored quality information of the edge link to the security controller. The quality information of the edge link may include any one or more of the following parameters: a packet loss rate, a traffic rate, a frame rate, a delay rate, and the like.

It should be noted that step S307 and steps S301 to S306 are concurrently performed, and the user obtains the edge service through the edge link when the security agent A monitors the quality of the edge link.

S308: The security controller receives the quality information of the edge link, and determines stability of the quality of the edge link based on the quality information of the edge link. When the quality of the edge link is determined to be abnormal, the security controller performs step S309.

For example, a method for determining, by the security controller, the stability of the quality of the edge link based on the quality information of the edge link includes the security controller that calculates a quality stability value based on the quality information of the edge link (for example, the packet loss rate, the traffic rate, the frame rate, and the delay rate) using a pre-designed mathematical model or an artificial intelligence model, compares a preset threshold with the calculated quality stability value, and determines whether the quality of the edge link is abnormal based on a comparison result.

Optionally, step S307 may be The security agent A monitors quality of an edge link between the terminal SDK and the security agent A, and determines stability of the quality of the edge link based on the quality of the edge link. If the quality of the edge link is determined to be abnormal, the security agent A sends abnormal quality information of the edge link to the security controller. After the optional step S307, step S309 is directly performed.

S309: The security controller sends new edge link information to an endpoint computing device with abnormal edge link quality.

The security controller reallocates the security agent B (or reallocates the security agent B and a new edge server) to the endpoint computing device with abnormal edge link quality. Usually, the reallocated security agent B is closer to the normal endpoint computing device and has stable performance. The security controller generates new edge link information, and the new edge link information includes any one or more of the following: an IP address and a port number of the security agent B, an IP address and a port number of the edge server, indication information of a connection between the endpoint computing device, and the security agent B and the edge server.

Optionally, some information (for example, the IP address of the edge server and the port number of the edge server) in the new edge link information may be encrypted by the security controller, and the security controller returns new edge link information including the encrypted ciphertext to a terminal SDK in the endpoint computing device with unstable link quality.

It should be noted that information of the edge server (for example, the IP address of the edge server and the port number of the edge server) included in the new edge link information sent by the security controller to the endpoint computing device with abnormal edge link quality may be the same as that of the edge server that originally provides the edge service for the endpoint computing device (that is, the edge server indicated by the original edge link information is the same as the edge server indicated by the new edge link information), or may be information of one of other edge servers that belong to a same edge computing device cluster as the original edge server, or may be information of an edge server in another edge computing device cluster that is whose physical location is closer to the endpoint computing device (that is, the new edge link information indicates a new edge server).

It should be noted that the security agent B reallocated by the security controller may be another security agent that belongs to the same edge computing device cluster as that of the security agent A, or a security agent in another edge computing device cluster whose physical location is closer to the endpoint computing device.

Optionally, the step S309 may alternatively be performed after the security controller sends a reconnection command to the terminal SDK corresponding to the endpoint computing device with abnormal edge link quality, and after the endpoint computing device that receives the reconnection command sends a reconnection request to the security controller.

S310: The endpoint computing device with abnormal edge link quality sends an edge service request to the security agent B.

After receiving the new edge link information, the terminal SDK corresponding to the endpoint computing device with abnormal edge link quality sends the edge service request to the security agent B based on the IP address and the port number of the security agent B in the new edge link information.

S311: The security agent B receives the edge service request sent by the endpoint computing device with abnormal edge link quality, and forwards the edge service request to the edge server.

S312: The edge server receives the edge service request, generates an edge service response based on the edge service request, and returns the edge service response to the security agent B.

S313: The security agent B receives the edge service response, and forwards the edge service response to the endpoint computing device with abnormal edge link quality.

The steps S301 to S313 are a process in which the security controller actively adjusts an edge link for the user based on quality information of the edge link when the system for providing an edge service provides an edge service for the user. The security controller reconnects the edge link in time based on the quality information of the edge link. After the steps S309 to S312, an endpoint computing device with abnormal edge link quality obtains an edge service using new edge link information. This resolves an abnormal edge link quality problem, ensures that the system for providing an edge service provides a stable edge service for the user, and provides good service experience for the user.

It should be noted that, within a specific time period, the plurality of endpoint computing devices may separately perform all or some of the foregoing steps S301 to S313.

Figure 5:
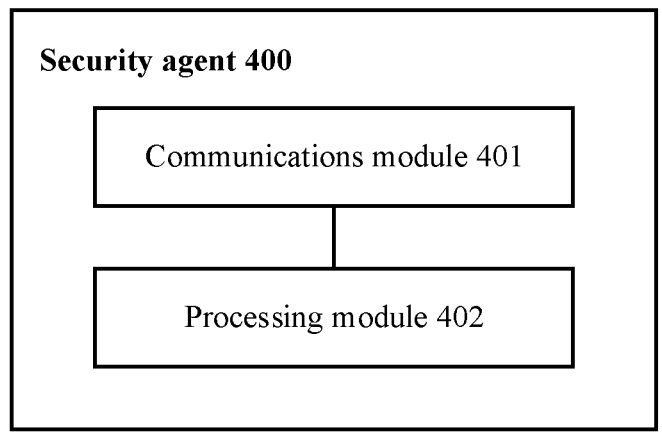
FIG. 5 is a schematic structural diagram of a security agent according to this application.

FIG. 5 provides a security agent 400. How to divide functional units in the apparatus is not limited in this application. The following provides an example of division into the functional units.

The security agent 400 includes a communications module 401 and a processing module 402. The security agent 400 is configured to execute an action executed by the security agent A in FIGS. 3A and 3B. The security agent 400 may further be configured to execute an action executed by the security agent A in FIG. 4. The security agent 400 may further integrate functions of the security agent A in FIGS. 3A and 3B and FIG. 4.

Further, the communications module 401 is configured to perform an operation of receiving, by the security agent A, an edge service request sent by the plurality of endpoint computing devices in the foregoing step S204, and S205, S207, and S208. Optionally, the communications module 401 is further configured to perform an operation of sending quality information of a link in the foregoing steps S304, S306, and S307.

The processing module 402 is configured to perform an operation of determining whether traffic sent by the endpoint computing device is abnormal in the foregoing step S204. Optionally, the processing module 402 is further configured to perform an operation of monitoring, by the security agent A, quality of an edge link between the endpoint computing device and the security agent A in the foregoing step S307.

Optionally, the security agent 400 is further configured to perform an optional operation performed by the security agent A in FIGS. 3A and 3B, FIG. 4, or FIGS. 3A and 3B and FIG. 4.

Figure 6:
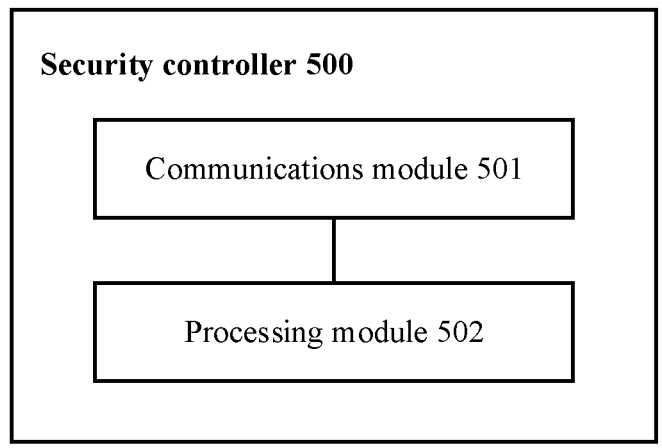
FIG. 6 is a schematic structural diagram of a security controller according to this application.

FIG. 6 provides a security controller 500. How to divide functional units in the apparatus is not limited in this application. The following provides an example of division into the functional units.

The security controller 500 includes a communications module 501 and a processing module 502. The security controller 500 is configured to execute an action executed by the security controller in FIGS. 3A and 3B. The security controller 500 may further be configured to execute an action executed by the security controller in FIG. 4. The security controller 500 may further integrate functions of the security controller in FIGS. 3A and 3B and FIG. 4.

Further, the communications module 501 is configured to perform an operation of receiving link abnormality information in the foregoing steps S202 and S209, and S210. Optionally, the communications module 501 is further configured to perform an operation of receiving quality information of a link in the foregoing steps S302 and S308, and S309.

The processing module 502 is configured to perform an operation of handling an abnormality in the step S209. Optionally, the processing module 502 is further configured to perform an operation of determining stability of quality of a link in the foregoing step S308.

Optionally, the security controller 500 is further configured to perform an optional operation performed by the security controller in FIGS. 3A and 3B, FIG. 4, or FIGS. 3A and 3B and FIG. 4.

Figure 7:
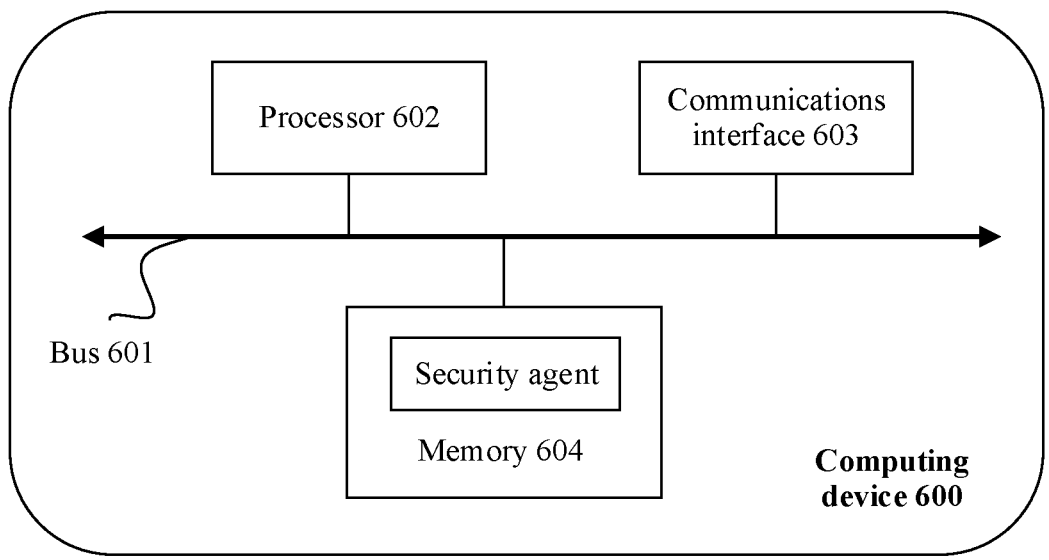
FIG. 7 is a schematic structural diagram of a computing device according to this application.

FIG. 7 provides a computing device 600. The computing device 600 includes a bus 601, a processor 602, a communications interface 603, and a memory 604. The processor 602, the memory 604, and the communications interface 603 may communicate with each other using the bus 601.

The processor 602 may be a central processing unit (CPU). The memory 604 may include a volatile memory, for example, a random-access memory (RAM). The memory 604 may further include a non-volatile memory, for example, a read-only memory (ROM), a flash memory, a hard disk drive (HDD), or a solid-state drive (SSD). The memory 604 stores executable program code, and the processor 602 executes the executable program code to perform an operation performed by the security agent A in the foregoing edge link reconnection method. The memory 604 may further include another software module, such as an operating system, required for running a process. The operating system may be LINUX®, UNIX®, WINDOWS®, or the like.

Further, the processor 602 executes the executable program code stored in the memory 604, so that the processor 602 performs an operation performed by the security agent 400. In this application, the security agent 400 may be a software module, and the processor 602 runs the security agent 400 stored in the memory 604 to perform the operation performed by the security agent 400.

Figure 8:
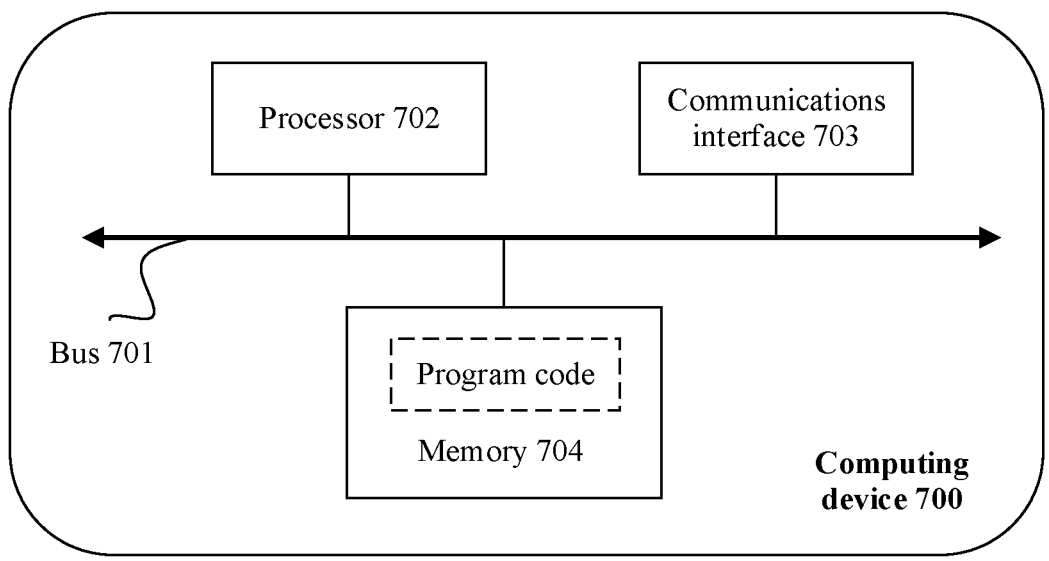
FIG. 8 is a schematic structural diagram of a computing device according to this application.

FIG. 8 provides a computing device 700. The computing device 700 includes a bus 701, a processor 702, a communications interface 703, and a memory 704. The processor 702, the memory 704, and the communications interface 703 may communicate with each other using the bus 701.

The processor 702 may be a CPU. The memory 704 may include a volatile memory, for example, a RAM. The memory 704 may further include a non-volatile memory, for example, a ROM, a flash memory, an HDD, or an SSD. The memory 704 stores executable program code, and the processor 702 executes the executable program code to perform an operation performed by the security agent A in the foregoing edge link reconnection method. The memory 704 may further include another software module, such as an operating system, required for running a process. The operating system may be LINUX®, UNIX®, WINDOWS®, or the like.

Further, the processor 702 executes the executable program code stored in the memory 704, so that the processor 702 performs an operation performed by the security agent 500.

This application further provides a system for providing an edge service. The system for providing an edge service includes a security controller and a plurality of edge computing device clusters, and each edge computing device cluster includes at least one security agent and at least one edge server. The at least one security agent in the system for providing an edge service is configured to execute an action executed by the security agent 400, and the security controller is configured to execute an action executed by the security controller 500.

A person of ordinary skill in the art may be aware that, in combination with the examples described in the embodiments disclosed in this specification, modules and method steps may be implemented by electronic hardware, computer software, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

When computer software is used for implementation, all or some of the embodiments may be implemented in a form of a computer program product. The computer program product includes one or more computer instructions. When the computer instruction is loaded and executed on a computer, the procedure or functions according to Embodiment 1 or Embodiment 2 of the present disclosure are all or partially generated. The computer may be a general-purpose computer, a special-purpose computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DIGITAL VERSATILE DISC (DVD)), or a semiconductor medium (for example, an SSD).

What is claimed is:

1. A method for providing an edge service applied to a system, comprising:
communicating, by a first security agent, data streams with a plurality of endpoint computing devices through a first edge link, wherein the system comprises a plurality of edge computing device clusters comprising a first edge computing device cluster, and wherein the first edge computing device cluster comprises the first security agent;
determining, by the first security agent based on the data streams, an abnormal endpoint computing device in the endpoint computing devices;
generating, by the first security agent, link abnormality information comprising a first address of the abnormal endpoint computing device;
sending, by the first security agent, the link abnormality information to a security controller, wherein the system includes the security controller;
receiving, by the security controller, the link abnormality information from the first security agent and the abnormal endpoint computing device;
generating, by the security controller, edge link information based on the link abnormality information; and
sending, by the security controller, the edge link information to a normal endpoint computing device in the endpoint computing devices,
wherein the edge link information comprises a second address of a second security agent.

2. The method of claim 1, further comprising further determining, by the first security agent based on a parameter of the data streams, an unsecure endpoint computing device in the endpoint computing devices as the abnormal endpoint computing device.

3. The method of claim 1, wherein after the receiving, the method further comprises handling, by the security controller, an abnormality on the abnormal endpoint computing device based on the link abnormality information.

4. The method of claim 3, further comprising:
rejecting, by the security controller, a link access request from the abnormal endpoint computing device; and
sending, by the security controller, a network termination request to a telecommunications (telco) server, wherein the network termination request instructs the telco server to stop providing network communication for the abnormal endpoint computing device.

5. The method of claim 1, further comprising:
establishing, by the normal endpoint computing device, a new edge link with the second security agent based on the edge link information; and
performing, by the normal endpoint computing device, second data stream transmission with the second security agent through the new edge link.

6. The method of claim 1, further comprising further determining, the abnormal endpoint computing device based on a parameter of the data stream, wherein a quality of a second edge link between the abnormal endpoint computing device and the first security agent is abnormal.

7. The method of claim 1, further comprising:
sending, by the security controller, the edge link information to the abnormal endpoint computing device;
establishing, by the abnormal endpoint computing device, a new edge link with the second security agent based on the edge link information; and
performing, by the abnormal endpoint computing device, second data stream transmission with the second security agent through the new edge link.

8. A method for providing an edge service implemented by a security controller, wherein the method comprises:
receiving link access requests from a plurality of endpoint computing devices;
sending, to each endpoint computing device of the endpoint computing devices, first edge link information comprising a first address of a first security agent;
receiving, from the first security agent and an abnormal endpoint computing device, link abnormality information comprising a second address of the abnormal endpoint computing device in the endpoint computing devices;
generating, based on the link abnormality information, second edge link information comprising a third address of a second security agent; and
sending the second edge link information to a normal endpoint computing device in the endpoint computing devices.

9. The method of claim 8, further comprising handling an abnormality on the abnormal endpoint computing device based on the link abnormality information, wherein the abnormal endpoint computing device is an insecure endpoint computing device in the endpoint computing devices.

10. The method of claim 9, further comprising:
rejecting a link access request from the abnormal endpoint computing device; and
sending a network termination request to a telecommunications (telco) server, wherein the network termination request instructs the telco server to stop providing network communication for the abnormal endpoint computing device.

11. The method of claim 8, further comprising sending the second edge link information to the abnormal endpoint computing device, wherein a quality of an edge link between the abnormal endpoint computing device and the first security agent is abnormal.

12. A computing device comprising:
a memory configured to store computer executable instructions; and
a processor coupled to the memory, wherein the computer executable instructions that when executed by the processor cause the computing device to be configured to:
receive link access requests from a plurality of endpoint computing devices;
send, to each endpoint computing devices, first edge link information comprising a first address of a first security agent;
receive, from the first security agent and an abnormal endpoint computing device, link abnormality information comprising a second address of the abnormal endpoint computing device in the endpoint computing devices;
generate, based on the link abnormality information, second edge link information comprising a third address of a second security agent; and
send the second edge link information to a normal endpoint computing device in the endpoint computing devices.

13. The computing device of claim 12, wherein the computer executable instructions further cause the computing device to be configured to handle an abnormality on the abnormal endpoint computing device based on the link abnormality information, and wherein the abnormal endpoint computing device is an insecure endpoint computing device in the endpoint computing devices.

14. The computing device of claim 13, wherein the computer executable instructions further cause the computing device to be configured to:
reject a link access request from the abnormal endpoint computing device; and
send a network termination request to a telecommunications (telco) server, wherein the network termination request instructs the telco server to stop providing network communication for the abnormal endpoint computing device.

15. The computing device of claim 12, wherein the computer executable instructions further cause the computing device to be configured to send the second edge link information to the abnormal endpoint computing device, and wherein a quality of an edge link between the abnormal endpoint computing device and the first security agent is abnormal.

16. The computing device of claim 12, wherein the second security agent is a virtual computing device.

17. The method of claim 1, wherein the second security agent is a virtual computing device.

* * * * *

UNITED STATES PATENT AND TRADEMARK OFFICE
CERTIFICATE OF CORRECTION

| | | |
|---|---|---|
| PATENT NO. | : 12,034,766 B2 | Page 1 of 1 |
| APPLICATION NO. | : 17/489098 | |
| DATED | : July 9, 2024 | |
| INVENTOR(S) | : Nannan Wang, Boai Yang and Qing Yin | |

It is certified that error appears in the above-identified patent and that said Letters Patent is hereby corrected as shown below:

On the Title Page

Item (71) Applicant: "Huawei Cloud Computing Technologies, Co., Ltd., Guizhou (CN)" should read "Huawei Cloud Computing Technologies Co., Ltd., Guizhou (CN)"

Signed and Sealed this
Twenty-fourth Day of September, 2024

Katherine Kelly Vidal
*Director of the United States Patent and Trademark Office*